United States Patent
Suginohara et al.

(10) Patent No.: US 9,578,296 B2
(45) Date of Patent: Feb. 21, 2017

(54) SIGNAL CONVERSION APPARATUS AND METHOD, AND PROGRAM AND RECORDING MEDIUM

(71) Applicant: MITSUBISHI ELECTRIC CORPORATION, Tokyo (JP)

(72) Inventors: Hidetsugu Suginohara, Tokyo (JP); Hideki Yoshii, Tokyo (JP); Satoshi Yamanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/653,419

(22) PCT Filed: Feb. 14, 2014

(86) PCT No.: PCT/JP2014/053398
§ 371 (c)(1),
(2) Date: Jun. 18, 2015

(87) PCT Pub. No.: WO2014/126180
PCT Pub. Date: Aug. 21, 2014

(65) Prior Publication Data
US 2015/0312542 A1 Oct. 29, 2015

(30) Foreign Application Priority Data
Feb. 14, 2013 (JP) ................. 2013-026353

(51) Int. Cl.
*G09G 3/20* (2006.01)
*G09G 3/36* (2006.01)
(Continued)

(52) U.S. Cl.
CPC ............... *H04N 9/77* (2013.01); *G09G 3/2003* (2013.01); *H04N 9/64* (2013.01); *H04N 9/646* (2013.01);
(Continued)

(58) Field of Classification Search
CPC combination set(s) only.
See application file for complete search history.

(56) References Cited

U.S. PATENT DOCUMENTS 5,929,843 A 7/1999 Tanioka
7,277,075 B1 10/2007 Hirano et al.
(Continued)

FOREIGN PATENT DOCUMENTS

CN 101510389 A 1/2008
CN 101510389 A 8/2009
(Continued)

OTHER PUBLICATIONS

Lee et al., "TFT-LCD with RGBW Color System", SID 03 Digest, pp. 1212-1215.

*Primary Examiner* — Wesner Sajous
(74) *Attorney, Agent, or Firm* — Birch, Stewart, Kolasch & Birch, LLP

(57) ABSTRACT

A maximum value Yimax and a minimum value Yimin of input pixel data Ri, Gi, Bi for each pixel are determined. A saturation adjustment value X is determined using a function g(Yimax, Yimin), white pixel data Wo is determined using a function f(Yimin), and these are used to determine output pixel data Ro, Go, Bo. Even the saturation represented by RGB three-color data is high, conversion to RGBW four-color data with improved brightness can be made, without changing the hue.

9 Claims, 8 Drawing Sheets

(51) Int. Cl.
  *H04N 9/77* (2006.01)
  *H04N 9/64* (2006.01)
  *H04N 9/69* (2006.01)
  *H04N 9/67* (2006.01)
(52) U.S. Cl.
  CPC ............ *H04N 9/67* (2013.01); *H04N 9/69* (2013.01); *G09G 3/3607* (2013.01); *G09G 2300/0452* (2013.01); *G09G 2320/0276* (2013.01); *G09G 2340/06* (2013.01); *G09G 2360/16* (2013.01)

(56) References Cited

U.S. PATENT DOCUMENTS

| | | | |
|---|---|---|---|
| 8,233,013 | B2 | 7/2012 | Morisue et al. |
| 2004/0046725 | A1 | 3/2004 | Lee |
| 2007/0223018 | A1* | 9/2007 | Lammers ............ H04N 9/67 358/1.9 |
| 2008/0084524 | A1 | 4/2008 | Inuzuka et al. |
| 2008/0150863 | A1 | 6/2008 | Morisue et al. |
| 2009/0160747 | A1 | 6/2009 | Morisue et al. |
| 2009/0207182 | A1 | 8/2009 | Takada et al. |
| 2010/0020242 | A1* | 1/2010 | Lammers ............ G09G 5/02 348/642 |
| 2010/0157091 | A1* | 6/2010 | Honda ............ H01L 27/14645 348/223.1 |
| 2011/0279703 | A1* | 11/2011 | Lee ............ H04N 9/735 348/223.1 |
| 2013/0093783 | A1* | 4/2013 | Sullivan ............ G09G 5/06 345/601 |

FOREIGN PATENT DOCUMENTS

| | | |
|---|---|---|
| JP | 5-241551 A | 9/1993 |
| JP | 2001-147666 A | 5/2001 |
| JP | 2004-102292 A | 4/2004 |
| JP | 2004-286814 A | 10/2004 |
| JP | 2005-277484 A | 10/2005 |
| JP | 2008-96548 A | 4/2008 |
| JP | 2008-176247 A | 7/2008 |
| JP | 2009-86053 A | 4/2009 |
| JP | 2009-192887 A | 8/2009 |
| JP | 4477020 B2 | 6/2010 |
| WO | WO 2006/077554 A2 | 7/2006 |
| WO | WO 2007/125630 A1 | 11/2007 |

\* cited by examiner

SIGNAL CONVERSION APPARATUS AND METHOD, AND PROGRAM AND RECORDING MEDIUM

TECHNICAL FIELD

The present invention relates to a signal conversion apparatus and method. The present invention also relates to a program for having a computer execute the functions of the signal processing apparatus, or the processes of the signal conversion method, and a recording medium for storing the program.

BACKGROUND ART

There have been known image display devices (such as liquid crystal displays, projectors, or organic EL displays) which can display images using four colors, including red (R), green (G), and blue (B), and in addition, white (W). In the present specification, such display devices will be called RGBW-type display devices. The three colors of red, green and blue are obtained by having white light pass through color filters of red, green and blue, respectively. The light is attenuated when passing through the color filters, making it difficult to raise the luminance of the image display device. For white, no color filter is needed (it is only necessary to provide a transparent filter), and attenuation due to the color filter does not occur. As a result, RGBW-type display devices are advantageous in that they can realize a higher luminance, compared with image display devices using only the three colors of red, green and blue.

In addition, RGBW-type display devices, such as liquid crystal display devices can achieve the same level of luminance as image display devices using only three colors of red, green and blue, by use of a lower backlight illuminance. Accordingly, the power consumption can be reduced.

The input pixel data supplied to a display device usually consist of data of three colors of red, green and blue. Therefore, in an RGBW-type display device, the three-color data of red, green and blue need to be converted to four color data of red, green, blue and white, before display. If this conversion is not properly made, for instance, white may be mixed in all the display colors, resulting in whitish images, and the color display may differ from what is intended by the input pixel data.

Patent Reference 1 and Non-patent Reference 1 disclose schemes for converting three-color data of red, green and blue to four-color data of red, green, blue and white, by which the brightness is improved without changing the hue and saturation.

PRIOR ART REFERENCES

Patent References

Patent reference 1: Japanese Patent Application Publication No. 2001-147666

Non-Patent References

Non-patent reference 1: SID 03 Digest, P. 1212 to 1215, TFT-LCD with RGBW Color System, Beak-woon Lee, et al.

SUMMARY OF THE INVENTION

Problems to be Solved by the Invention

However, in the schemes disclosed in these references, when the saturation represented by the three colors of red, green and blue is high, the data of white, after the conversion, cannot be set to a high value, so that the brightness after the conversion cannot be made high.

Means for Solving the Problem

To solve the above problem, the signal conversion apparatus of the present invention comprises:

a pixel value comparison unit for outputting a maximum value Yimax and a minimum value Yimin of input pixel data Ri, Gi, Bi of red, green and blue for each pixel;

a saturation adjustment value calculation unit for determining a saturation adjustment value X by using a first function g(Yimax, Yimin) which does not exceed an upper limit L which is given from the maximum value Yimax, and the minimum value Yimin, by the expression (1) subsequently set forth;

a three-color pixel value calculation unit for determining output pixel data Ro, Go, Bo, by using the input pixel data Ri, Gi, Bi, the maximum value Yimax, and the saturation adjustment value X, by the expression (4r), (4g) and (4b) subsequently set forth; and a white pixel value calculation unit for determining white pixel data Wo from the minimum value Yimin by using a second function f(Yimin);

wherein when the saturation adjustment value X is larger than the white pixel data Wo, the saturation represented by the output pixel data Ro, Go, Bo and the white pixel data Wo is made higher than the saturation represented by the input pixel data Ri, Gi, Bi, and when the saturation adjustment value X is smaller than the white pixel data Wo, the saturation represented by the output pixel data Ro, Go, Bo and the white pixel data Wo is made lower than the saturation represented by the input pixel data Ri, Gi, Bi.

Effects of the Invention

According to the present invention, it is possible to convert the three-color data of red, green and blue to four-color data of red, green, blue and white with improved brightness, without changing the hue, even when the saturation represented by the three-color data is high.

Also it is also possible to perform color conversion by which, the saturation is raised when the saturation adjustment value X has a value larger than the white pixel data Wo, and the saturation is lowered when the saturation adjustment value X has a value smaller than the white pixel data Wo.

That is, it is possible to alter the manner in which the saturation is varied, by the settings of the first function g(Yimax, Yimin) which determines the saturation adjustment value X, and the second function f(Yimin) which determines the white pixel data Wo.

Also, according to the present invention, it is possible to vary the gradation value of each of the pixel data of red, green and blue, without clipping to an upper limit value, thereby to afford desired changes to the saturation.

Also, it is possible to determine the gradation value of the white pixel data without regard to the saturation of the input pixel data. As a result, by setting the gradation value of the white pixel data to a large value, the luminance obtained by driving the RGBW-type display unit with the output of the signal conversion apparatus of the present invention can be increased freely. It is accordingly possible to realize the required luminance with a smaller electric power than before.

Furthermore, when the output of the signal conversion of the present invention is used to drive an RGBW-type display unit having a difference between the luminance displayed by the pixel data of red, green and blue of a certain gradation value, and the luminance displayed by the white pixel data of the same gradation value, an appropriate RGBW signal conversion can be achieved by adjusting the saturation adjustment value based on the difference in the luminance.

MODE FOR CARRYING OUT THE INVENTION

Embodiments of the present invention will now be described with reference to the drawings.
Embodiment 1.

Figure 1:
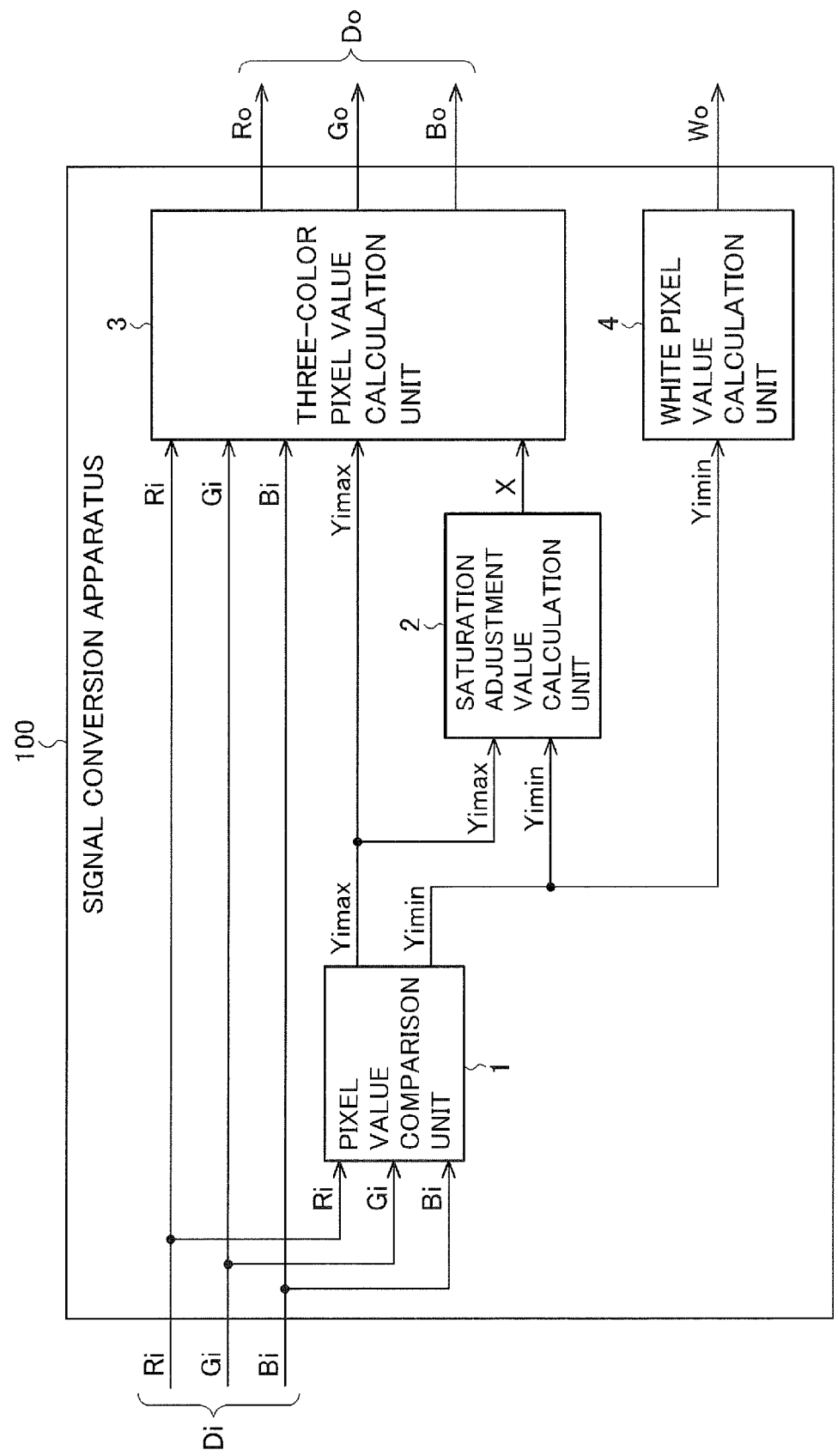
FIG. 1 is a block diagram schematically illustrating an example of configuration of a signal conversion apparatus 100 of Embodiment 1 of the present invention.

FIG. 1 is a block diagram schematically illustrating a configuration of a signal conversion apparatus 100 of Embodiment 1 of the present invention. The signal conversion apparatus 100 converts an input image signal Di formed of three-color data (input pixel data) Ri, Gi, Bi of red, green and blue for each pixel, to an output image signal Do formed of four-color data (output pixel data) Ro, Go, Bo, Wo of red, green, blue and white.

The input pixel data Ri, Gi, Bi are preferably data which respectively change linearly with respect to the luminance of the three colors of red, green and blue. The invention, however, is not limited to this. This is because whether or not the gamma characteristic has been removed does not give significant effects on the displayed image, given the display characteristics required of an ordinary image display.

In general, three-color pixel data of red, green and blue included in the image/video data of bit-map, MPEG or the like are 8-bit digital data which express a gradation value of 0 to 255 for each of red, green and blue and which have been gradation-converted in conformity with the gamma characteristic of display devices. To convert the digital data to data representing a gradation value which varies linearly with respect to the luminance, the gamma characteristic needs to be removed. In the removal of the gamma characteristic, it is necessary to increase the number of bits for expressing the data varying linearly with respect to the luminance, in order to maintain calculation accuracy, and avoid gradation crush. When the number of bits of the data increases, the circuitry required for the conversion processing performed by the signal conversion apparatus 100 becomes complicated and large-sized, resulting in increase in the cost.

The input pixel data Ri, Gi, Bi may therefore be 8-bit digital data for each of red, green and blue, representing a gradation value of 0 to 255, without the gamma characteristic having been removed. That is, the signal conversion by the signal conversion apparatus 100 according to the present invention may be applied regardless of whether the input pixel data Ri, Gi, Bi are data having a gradation value which varies linearly with respect to the luminance, or digital data from which the gamma characteristic has not been removed. In the following description of the embodiment, the input pixel data Ri, Gi, Bi are assumed to be 8-bit digital data representing a gradation value of 0 to 255.

When the input pixel data Ri, Gi, Bi are 8-bit digital data representing a gradation value of 0 to 255 for red, green and blue, from which the gamma characteristic has not been removed, the output pixel data Ro, Go, Bo, Wo of the signal conversion apparatus 100 will be given as digital data from which the gamma characteristic has not been removed. The output pixel data Ro, Go, Bo, Wo are output to an RGBW-type display unit (see FIG. 12 later described), and displayed as an image.

In the following description of the embodiment, the output pixel data Ro, Go, Bo, Wo are assumed to be 8-bit digital data, as are the input pixel data Ri, Gi, Bi. However, to improve the accuracy in the result of computation, the number of bits may be increased to 10 or 12. When the number of bits of the output pixel data Ro, Go, Bo, Wo is larger than the number of bits which the RGBW-type display unit is able to handle, they may be output after reducing the number of bits, while maintaining the accuracy in the result of computation, by for example using an error diffusion method.

In FIG. 1, the signal conversion apparatus 100 includes a pixel value comparison unit 1, a saturation adjustment value calculation unit 2, a three-color pixel value calculation unit 3, and a white pixel value calculation unit 4. Each component will now be described.

The pixel value comparison unit 1 receives, as inputs, the input pixel data Ri, Gi, Bi, and compares the values of these data for each pixel (pixel values), and outputs the maximum value (the maximum value for each pixel) Yimax, and the minimum value (the minimum value for each pixel) Yimin.

The saturation adjustment value calculation unit 2 receives, as inputs, the maximum value Yimax and the minimum value Yimin output from the pixel value comparison unit 1, and calculates a saturation adjustment value X for each pixel, using a predetermined function g(Yimax, Yimin) taking the maximum value Yimax and the minimum value Yimin as variables, and outputs the saturation adjustment value X.

Figure 2:
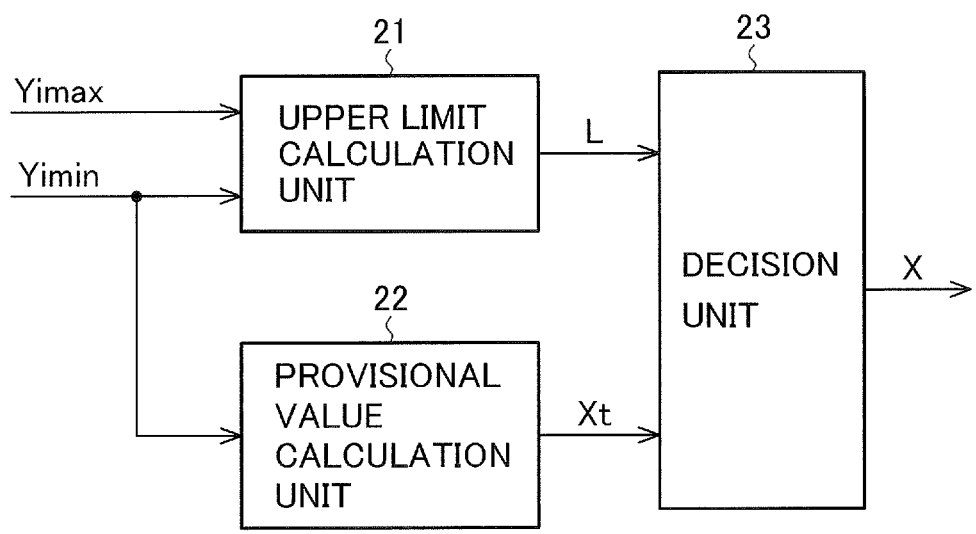
FIG. 2 is a block diagram schematically illustrating an example of configuration of a saturation adjustment value calculation unit 2 in Embodiment 1.

The configuration of the saturation adjustment value calculation unit 2 in Embodiment 1 is shown in FIG. 2. The illustrated saturation adjustment value calculation unit 2 includes an upper limit calculation unit 21, a provisional value calculation unit 22, and a decision unit 23.

The upper limit calculation unit 21 receives, as inputs, the maximum value Yimax and the minimum value Yimin output from the pixel value comparison unit 1, and performs the following calculation to determine an upper limit L.

[Mathematical Expression 1]

$$L = \frac{Yi\max \times Yi\min}{Yi\max - Yi\min} \quad (1)$$

The provisional value calculation unit 22 determines a provisional value Xt using a predetermined function gt(Yimin) taking the minimum value Yimin as a variable.

[Mathematical Expression 2]

$$Xt = gt(Yi\min) \quad (2)$$

The decision unit 23 compares the upper limit L and the provisional value Xt, and outputs the smaller of the two, as the saturation adjustment value X. That is, the saturation adjustment value X is restricted to a value equal to or smaller than the upper limit L.

When the maximum value Yimax and the minimum value Yimin are equal, the denominator of the expression (1) is 0, so that the upper limit L cannot be obtained by a computer. In this case, the upper limit L is assumed to be infinity, and the provisional value Xt is unconditionally output as the saturation adjustment value X.

In summary, the processing in the saturation adjustment value calculation unit 2 to determine the saturation adjustment value X can be expressed as follows, using the function g(Yimax, Yimin) taking the maximum value Yimax and the minimum value Yimin as variables.

[Mathematical Expression 3]

$$X = g(Yi\max, Yi\min) \quad (3)$$

$$= \begin{cases} gt(Yi\min) & \left(\text{if } gt(Yi\min) \leq \frac{Yi\max \times Yi\min}{Yi\max - Yi\min} \right. \\ & \left. \text{or } Yi\max = Yi\min\right) \\ \frac{Yi\max \times Yi\min}{Yi\max - Yi\min} & (\text{otherwise}) \end{cases}$$

The three-color pixel value calculation unit 3 receives, as inputs, the input pixel data Ri, Gi, Bi, the maximum value Yimax output from the pixel value comparison unit 1, and the saturation adjustment value X output from the saturation adjustment value calculation unit 2, and performs the calculations represented by the following expressions, to determine and output the output pixel data Ro, Go, Bo.

[Mathematical Expression 4]

$$Ro = Ri \times \frac{(X + Yi\max)}{Yi\max} - X \quad (4r)$$

$$Go = Gi \times \frac{(X + Yi\max)}{Yi\max} - X \quad (4g)$$

$$Bo = Bi \times \frac{(X + Yi\max)}{Yi\max} - X \quad (4b)$$

The white pixel value calculation unit 4 receives, as an input, the minimum value Yimin output from the pixel value comparison unit 1, determines white pixel data Wo using a predetermined function f(Yimin) taking the minimum value Yimin as a variable, and outputs the determined white pixel data Wo. The white pixel data Wo is 8-bit digital data, so that the function f(Yimin) needs to assume a value of 0 to 255.

[Mathematical Expression 5]

$$Wo = f(Yi\min) \quad (5)$$

The manner of converting the three-color pixel data Ri, Gi, Bi of red, green and blue to the four-color pixel data Ro, Go, Bo, Wo in the signal conversion apparatus 100 of the present embodiment will now be described in detail.

As a method for expressing color, various color spaces have been proposed. For example, the HSV color space is a color space consisting of three components of hue H, saturation S, and brightness V. The hue H, the saturation S, and the brightness V can be determined by the following expressions using 8-bit digital data Rn, Gn, Bn representing color components of the three colors of red, green and blue. In the following expressions, Ynmax and Ynmin are the maximum value and the minimum value of the digital data Rn, Gn, Bn.

[Mathematical Expression 6]

$$H = \text{Arctan}\left\{\sqrt{3} \frac{Gn - Bn}{2Rn - Gn - Bn}\right\} \quad (6h)$$

$$S = \frac{Yn\max - Yn\min}{Yn\max} \quad (6s)$$

$$V = \frac{Yn\max}{255} \quad (6v)$$

Accordingly, the hue Hi, the saturation Si, and the brightness Vi of the input pixel data Ri, Gi, Bi are respectively represented by the following expressions (7h), (7s), and (7v).

[Mathematical Expression 7]

$$Hi = \text{Arctan}\left\{\sqrt{3} \frac{Gi - Bi}{2Ri - Gi - Bi}\right\} \quad (7h)$$

$$Si = \frac{Yi\max - Yi\min}{Yi\max} \quad (7s)$$

$$Vi = \frac{Yi\max}{255} \quad (7v)$$

How the hue H, the saturation S and the brightness V vary by the signal conversion according to the present embodiment will now be described. The signal conversion apparatus 100 converts the input pixel data Ri, Gi, Bi to the output pixel data Ro, Go, Bo, Wo. It holds true before and after the conversion that white, which is an achromatic color, can be expressed by using the three colors of red, green and blue equally (by making equal the gradation values of the pixel data of red, green and blue), so that part or the entirety of the white component expressed by the white pixel data after the conversion, can be equally allocated to the pixel data of the three colors of red, green and blue. In other words, the four-color pixel data of red, green, blue and white can be replaced with three-color pixel data having values expressed by Ro+Wo, Go+Wo, Bo+Wo, if the values of the pixel data are not restricted to the range which can be expressed by 8 bits. That is, driving the display unit with the three-color pixel data obtained by the replacement will result in the display at the same luminance, as driving the display unit with the four-color pixel data of red, green, blue and white. The hue Ho indicated by the three-color pixel data Ro+Wo, Go+Wo, Bo+Wo is given by the following expression.

[Mathematical Expression 8]

$$Ho = \text{Arctan}\left\{\sqrt{3}\,\frac{(Go+Wo)-(Bo+Wo)}{2(Ro+Wo)-(Go+Wo)-(Bo+Wo)}\right\} \quad (8)$$

If Ro, Go, Bo in the expression (8) are respectively replaced with the expressions (4r), (4g), (4b), the numerator of the fraction in the right side of the expression (8) will be:

[Mathematical Expression 9]

$$(Go+Wo)-(Bo+Wo)= \quad (9)$$
$$\left(Gi \times \frac{(X+Yi\max)}{Yi\max)}-X+Wo\right)-\left(Bi \times \frac{(X+Yi\max)}{Yi\max}-X+Wo\right)=$$
$$\frac{(X+Yi\max)}{(Yi\max)} \times (Gi-Bi)$$

The denominator will be:

[Mathematical Expression 10]

$$2(Ro+Wo)-(Go+Wo)-(Bo+Wo)= \quad (10)$$
$$2\left(Ri \times \frac{(X+Yi\max)}{Yi\max}-X+Wo\right)-\left(Gi \times \frac{(X+Yi\max)}{Yi\max}-X+Wo\right)-$$
$$\left(Bi \times \frac{(X+Yi\max)}{Yi\max}-X+Wo\right)=\frac{(X+Yi\max)}{(Yi\max)} \times (2Ri-Gi-Bi)$$

Therefore,

[Mathematical Expression 11]

$$Ho = \text{Arctan}\left\{\sqrt{3}\,\frac{\frac{(X+Yi\max)}{Yi\max} \times (Gi-Bi)}{\frac{(X+Yi\max)}{Yi\max} \times (2Ri-Gi-Bi)}\right\} \quad (11)$$
$$= \text{Arctan}\left\{\sqrt{3}\,\frac{(Gi-Bi)}{(2Ri-Gi-Bi)}\right\}$$
$$= Hi$$

By rewriting (simplifying the right side of) the expression as above, it will be seen that the hue Ho after the conversion (the hue expressed by the output pixel data Ro, Go, Bo, Wo) is equal to the hue Hi before the conversion (the hue expressed by the input pixel data Ri, Gi, Bi). Thus, the signal conversion according to the present embodiment does not alter the hue H.

Next, an explanation on the saturation S is given. The maximum value of the output pixel data Ro, Go, Bo for each pixel is denoted by Yomax, and the minimum value of the output pixel data Ro, Go, Bo for each pixel is denoted by Yomin. By the conversion using the expressions (4r), (4g), (4b), the maximum value Yimax before the conversion will become the maximum value Yomax. That is, if Yimax is substituted for Ri, and Yomax is substituted for Ri in the expression (4r), the result will be as follows:

[Mathematical Expression 12]

$$Yo\max = Yi\max \times \frac{(X+Yi\max)}{Yi\max}-X = Yi\max \quad (12)$$

The expression (12) shows that Yomax is equal to Yimax. Similarly, Yimin is converted to Yomin. If Yimin is substituted for Ri and Yomin is substituted for Ro in the expression (4r), the result will be as follows:

[Mathematical Expression 13]

$$Yo\min = Yi\min \times \frac{(X+Yi\max)}{Yi\max}-X \quad (13)$$

The saturation So obtained when display is made using the sums Ro+Wo, Go+Wo, Bo+Wo of the pixel data of red, green and blue and the pixel data of white after the signal conversion is given by the following expression, from the expression (6s).

[Mathematical Expression 14]

$$So = \frac{(Yo\max+Wo)-(Yo\min+Wo)}{Yo\max+Wo} = \frac{Yo\max-Yo\min}{Yo\max+Wo} \quad (14)$$

If Yomax and Yomin in the expression (14) are replaced with the expressions (12) and (13), and the saturation Si (see the expression (6s)) of the input pixel data is used, the expression can be rewritten as follows:

[Mathematical Expression 15]

$$So = \frac{Yi\max-\left\{Yi\min \times \frac{(X+Yi\max)}{Yi\max}-X\right\}}{Yi\max+Wo} \quad (15)$$
$$= \frac{Yi\max^2-Yi\min \times X-Yi\min \times Yi\max+Yi\max \times X}{Yi\max \times (Yi\max+Wo)}$$
$$= \frac{(Yi\max-Yi\min) \times (Yi\max+X)}{Yi\max \times (Yi\max+Wo)}$$
$$= Si \times \frac{Yi\max+X}{Yi\max+Wo}$$

The expression (15) indicates that the saturation So after the signal conversion (the saturation expressed by the output pixel data Ro, Go, Bo, Wo) varies depending on the saturation adjustment value X and the value of the white pixel data Wo. When the saturation adjustment value X and the white pixel data Wo are equal, the saturation before the signal conversion and the saturation after the signal conversion are equal. When the saturation adjustment value X is larger than the white pixel data Wo, the saturation is increased by the signal conversion. Conversely, when the saturation adjustment value X is smaller than the white pixel data Wo, the saturation is reduced by the signal conversion.

Since the saturation adjustment value X and the white pixel data Wo are respectively given by the expressions (3) and (5), the magnitude relationship between them are determined by the function g(Yimax, Yimin) and the function f(Yimin).

To simplify the explanation, it is assumed that the function gt(Yimin) for determining the provisional value Xt is a linear function with a coefficient being equal to 1.2 and without any constant term, as represented by the following expression (16). The following explanation is given on such an assumption.

[Mathematical Expression 16]

$$gt(Yimin) = 1.2 \times Yimin \qquad (16)$$

When the expression (16) is applied to the expression (3), the following expression is obtained.

[Mathematical Expression 17]

$$g(Yimax, Yimin) = \begin{cases} 1.2 \times Yimin & \left(\text{if } 1.2 \leq \dfrac{Yimax}{Yimax - Yimin} \text{ or } Yimax = Yimin\right) \\ \dfrac{Yimax \times Yimin}{Yimax - Yimin} & (\text{otherwise}) \end{cases} \qquad (17)$$

By using the saturation Si expressed by the input pixel data Ri, Gi, Bi, the expression (17) can be rewritten as follows:

[Mathematical Expression 18]

$$g(Yimax, Yimin) = \begin{cases} 1.2 \times Yimin & \left(\text{if } 1.2 \leq \dfrac{1}{Si} = 0.833 \text{ or } Si = 0\right) \\ \dfrac{1}{Si} \times Yimin & (\text{otherwise}) \end{cases} \qquad (18)$$

Similarly, it is assumed that the function f(Yimin) for determining the white pixel data Wo is a linear function with a coefficient being equal to 1.1 and without any constant term, (and with its value being clipped to the upper limit value 255,) as shown by the following expression (19).

[Mathematical Expression 19]

$$f(Yimin) = \begin{cases} 1.1 \times Yimin & \left(\text{if } Yimin \leq \dfrac{255}{1.1} = 231.818\right) \\ 255 & \left(\text{if } Yimin > \dfrac{255}{1.1} = 231.818\right) \end{cases} \qquad (19)$$

In the expression (19), when Yimin>231.818, f(Yimin) is clipped to a fixed value of 255 (f(Yimin)=255). However, if "255/Yimin" is seen as a coefficient for "Yimin", it can be seen that the coefficient value of the linear function f(Yimin) gradually decreases with increasing Yimin.

Thus, the right side of each of the expressions (18) and (19) includes Yimin multiplied by a coefficient, so that the magnitude relationship between the function g(Yimax, Yimin) and the function f(Yimin) depends on the magnitude relationship between the coefficient parts.

Figure 3:
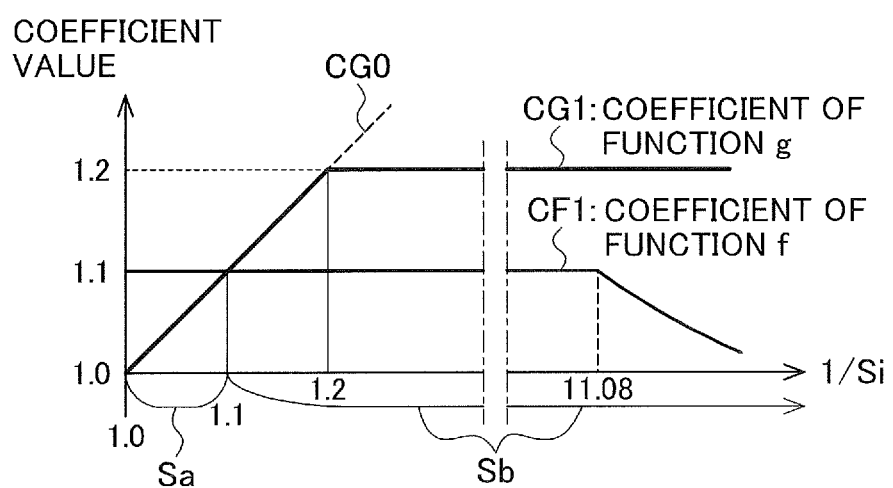
FIG. 3 is a graph showing variations of the values of coefficient values in a function g(Yimax, Yimin), and a function f(Yimin) in Embodiment 1.

FIG. 3 shows how the coefficient values of the function g(Yimax, Yimin) and the function f(Yimin) vary with respect to 1/Si on the horizontal axis. The saturation Si assumes a value of 0 to 1.0, so that 1/Si on the horizontal axis assumes a value of 1.0 to infinity.

In FIG. 3, a graph showing the coefficient of the function g(Yimax, Yimin) is the solid line CG1. The solid line CG1 coincides with the graph of coefficient value=1/Si indicated by the broken line CG0 in the interval where 1/Si is 1.0 to 1.2, and the coefficient value is fixed at 1.2 in the interval where 1/Si is equal to or greater than 1.2.

On the other hand, a graph showing the coefficient of the function f(Yimin) is the solid line CF1. The solid line CF1 is fixed at 1.1 regardless of the value of 1/Si on the horizontal axis. However, in the interval where the function f(Yimin) is clipped to the upper limit value 255, the coefficient of the function f(Yimin) assumes a value which, in effect, is smaller than 1.1. This is the interval where Yimin assumes a value greater than 255/1. 1=231.818, and 1/Si is greater than 255/23≈411.08. This is because the saturation Si assumes its maximum Si=23/255, when Yimax=255, and Yimin=232.

The saturation So after the signal conversion is explained referring to the graphs of FIG. 3. In the interval Sa where 1/Si on the horizontal axis in FIG. 3 is 1.0 to 1.1, the coefficient of the function g(Yimax, Yimin) assumes a value smaller than the coefficient of the function f(Yimin). Accordingly, in the interval Sa, the saturation adjustment value X assumes a value smaller than the white pixel data Wo. As a result, because of the relationship of the expression (15), the saturation So after the signal conversion is smaller than the saturation Si before the signal conversion (the saturation represented by the input pixel data Ri, Gi, Bi).

In the interval Sb where 1/Si on the horizontal axis in FIG. 3 exceeds 1.1, the coefficient of the function g(Yimax, Yimin) assumes a value greater than the coefficient of the function f(Yimin). Accordingly, in the interval Sb, the saturation adjustment value X assumes a value greater than the white pixel data Wo. As a result, the saturation So after the signal conversion is greater than the saturation Si before the signal conversion (the saturation represented by the input pixel data Ri, Gi, Bi).

In the above example, the magnitude relationship between the function g(Yimax, Yimin) and the function f(Yimin) varies depending on the saturation Si of the input pixel data. However, the relationship between the functions g(Yimax, Yimin) and f(Yimin), and the saturation Si, varies depending on the contents of the functions g(Yimax, Yimin) and f(Yimin). The magnitude relationship between the functions g(Yimax, Yimin) and f(Yimin) also varies depending on the contents of the functions g(Yimax, Yimin) and f(Yimin). The functions g(Yimax, Yimin) and f(Yimin) may be determined to always satisfy:

g(Yimax, Yimin)>f(Yimin), so that the saturation is always increased by the signal conversion. Alternatively, the functions may be determined to always satisfy:

g(Yimax, Yimin)<f(Yimin), so that the saturation is always decreased by the signal conversion.

However, in the present embodiment, the upper limit L given by the expression (1) is set for the function g(Yimax, Yimin). The setting of the upper limit L is derived in the following manner, by giving, to the expression (13) for determining Yomin, a condition that Yomin is a non-negative value, i.e., of a value equal to or greater than 0 (the condition that the right side of the expression (13) is equal to or greater than 0).

[Mathematical Expression 20]

$$Yomin = Yimin \times \frac{(X + Yimax)}{Yimax} - X \geq 0 \quad (20)$$

By rewriting this expression, the following inequality is obtained.

[Mathematical Expression 21]

$$X \leq \frac{Yimax \times Yimin}{Yimax - Yimin} = L \quad (21)$$

Figure 4:
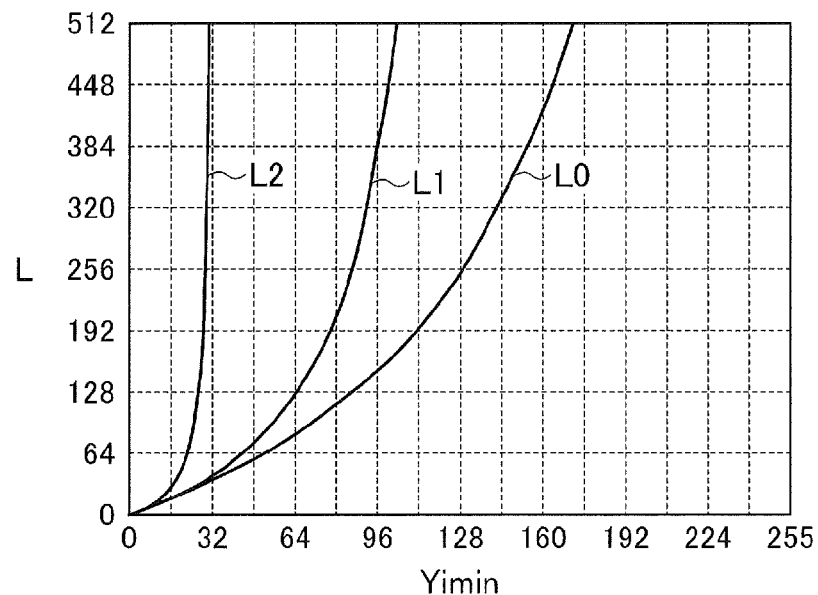
FIG. 4 is a graph showing variations in an upper limit L with respect to the minimum value Yimin.

FIG. 4 shows the upper limit L given by the expression (1) on the vertical axis, and Yimin on the horizontal axis. The solid line L0 is a graph for Yimax=255; the solid line L1 is a graph for Yimax=128; and the solid line L2 is a graph for Yimax=32. As shown in FIG. 4, as Yimax is increased, the value of the upper limit L becomes smaller, and the range in which the function g(Yimax, Yimin) can be set is reduced.

Actually, it can be said that the function g(Yimax, Yimin) is more affected by the upper limit L when the saturation Si of the input pixel data is higher. This will be understood from the fact that the coefficient of the function g(Yimax, Yimin) is restricted to a value smaller than 1.2 in the interval where 1/Si is 1.0 to 1.2, i.e., Si is 0.833 to 1.0, in FIG. 3. The restriction corresponds to the fact that when the saturation Si represented by the input pixel data is high, the width by which the saturation can be increased by the signal conversion is reduced, because the upper limit value of the saturation S is 1.0, and a large value cannot be set for the saturation adjustment value X.

On the other hand, the present invention imposes no restriction on the function f(Yimin), other than that the output value is within the range of 0 to 255, and the function can be set freely.

Finally, the brightness V will be described. From the expression (12), Yomax=Yimax, so that the brightness Vo is determined by the following expression.

[Mathematical Expression 22]

$$Vo = \frac{(Yomax + Wo)}{255} = Vi + \frac{Wo}{255} \quad (22)$$

The signal conversion thus increases the brightness by a value obtained by dividing the white pixel data Wo by 255.

Thus, according to the signal conversion of the present invention, when comparison is made between the values before and after the signal conversion, the hue is maintained, the brightness is increased in proportion to the white pixel data Wo, and the saturation is increased or decreased depending on the magnitude relationship between the saturation adjustment value X and the white pixel data Wo.

The saturation adjustment value X is restricted by the upper limit L which depends on the saturation Si represented by the input pixel data, whereas no restriction is imposed on the white pixel data Wo, except that it should be within a range which can be expressed by 8-bit digital data.

That is, in the signal conversion of the present embodiment, an arbitrary white pixel data Wo can be calculated based on Yimin, so that the increase in brightness can be decided arbitrarily.

In the conventional signal conversion apparatus, with regard to the saturation So represented by the pixel data after the signal conversion, no changes from the saturation Si represented by the input pixel data is allowed. As a result, when the saturation Si represented by the input pixel data is high, the white pixel data Wo cannot be set to a large value, and the increase in the brightness Vo may be restricted. According to the invention, variation in the saturation is allowed, and a restriction is imposed on the variation in the saturation, thereby eliminating the restriction on the brightness Vo.

According to the present embodiment, the luminance in the RGBW-type display unit can be improved by increasing the brightness Vo. Conversely, the luminance which is realized by the conventional image display unit using only the three colors of red, green and blue, can be realized with a smaller electric power.

Also, by deciding the manner of calculating the saturation adjustment value X in the saturation adjustment value calculation unit 2, taking the manner of calculating the brightness as a reference the saturation after the signal conversion can be controlled.

In Embodiment 1, the function g(Yimax, Yimin) and the function f(Yimin) are linear functions without any constant term. However, there is no restriction on the form of the functions, and a quadratic function, or a cubit function may be used. Also, an exponential function may be used. Furthermore, the two functions may be in the form of completely different functions.

Depending on how the function g(Yimax, Yimin) for determining the saturation adjustment value X used in the saturation adjustment value calculation unit 2, and the function f(Yimin) for determining the white pixel data Wo used in the white pixel value calculation unit 4 are set, the saturation So represented by the pixel data after the signal conversion can be controlled to vary as desired, from the saturation Si represented by the input pixel data.

For instance, in the example shown in FIG. 3, when the saturation Si represented by the input pixel data is not high, the saturation So represented by the pixel data after the signal conversion may be increased, thereby making it possible to prevent the display color from becoming visually pale, because of the increase in the brightness owing to the white pixel data Wo.

Also, the function g(Yimax, Yimin) and the function f(Yimin) may be changeable. The change of the functions may be effected by alteration of the value of the coefficient in the expression (18) or (19). When the function has a constant term, the value of the constant term may be altered. The change may be effected depending on the usage environment of the display unit performing the display based on the pixel data output from the signal conversion apparatus of the present embodiment. For instance, the usage environment may be detected, and the above change may be made automatically based on the result of the detection, or the above change may be made based on the operation input by the user.

The changes may be made automatically or responsive to the operation input by the user.

For instance, when it desired to give priority to the improvement in the saturation, the function g(Yimax, Yimin) and the function f(Yimin) are so set that the saturation adjustment value X is larger than the white pixel data Wo; when it is desired to give priority to the improvement in the brightness, a function outputting a greater value is set as the function f(Yimin) for determining the white pixel data Wo.

In this way, by automatically changing the function g(Yimax, Yimin) and the function f(Yimin) depending on the usage environment, it is possible to alter the signal conversion to permit selection. For instance, the brightness may be increased for improving the visibility in an extremely bright environment such as out of doors in the daytime. Alternatively, the saturation is increased to enrich the color expression in an environment, such as in dark indoors, where it is not necessary to increase the brightness.

Embodiment 2.

The overall configuration of the signal conversion apparatus of Embodiment 2 is identical to that of the signal conversion apparatus 100 of FIG. 1 described in Embodiment 1. But the saturation adjustment value calculation unit 2 and the white pixel value calculation unit 4 differ from those in Embodiment 1. The remaining parts are identical to those in Embodiment 1, so that their description will be omitted.

Figure 5:
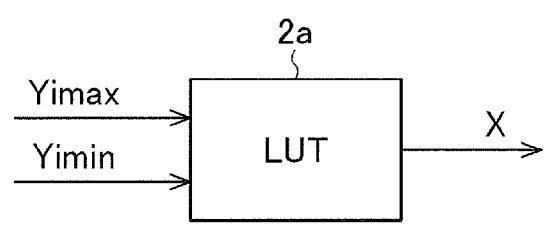
FIG. 5 is a block diagram schematically illustrating an example of configuration of a saturation adjustment value calculation unit 2 used in Embodiment 2 of the present invention.

FIG. 5 is a block diagram schematically illustrating the configuration of the saturation adjustment value calculation unit 2 in Embodiment 2. The illustrated saturation adjustment value calculation unit 2 is formed of a conversion table (Look Up Table: LUT) 2a.

The LUT 2a takes Yimax and Yimin on coordinate axes of a two-dimensional address space, receives Yimax and Ymin as address inputs, and outputs the data stored in the memory location designated by the address, as the value of the function g(Yimax, Yimin) represented by the above expression (1). The function g(Yimax, Yimin) is restricted to a value equal to or smaller than the upper limit L, as described in Embodiment 1. By using a LUT, any arbitrary function can be realized.

Figure 6:
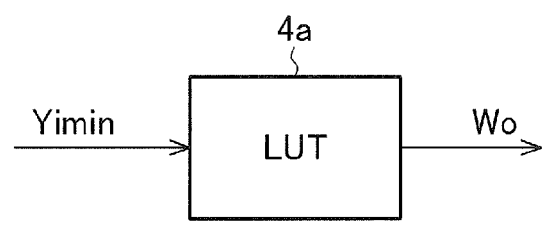
FIG. 6 is a block diagram schematically illustrating an example of configuration of a white pixel value calculation unit 4 used in Embodiment 2.

FIG. 6 is a block diagram schematically illustrating the configuration of the white pixel value calculation unit 4 in Embodiment 2. The illustrated white pixel value calculation unit 4 is formed of a conversion table (LUT) 4a. The LUT 4a takes Ymin on a coordinate axis in a one-dimensional address space, receives Yimin as an address input, and outputs the data stored in the memory location designated by the address, as the value of the function f(Yimin) represented by the expression (5).

The output value of the LUT 4a should be within the range (the range of from 0 to 255) which can be expressed by 8-bit digital data, but there is no other restriction. By using a LUT, any arbitrary function can be realized.

Figure 7:
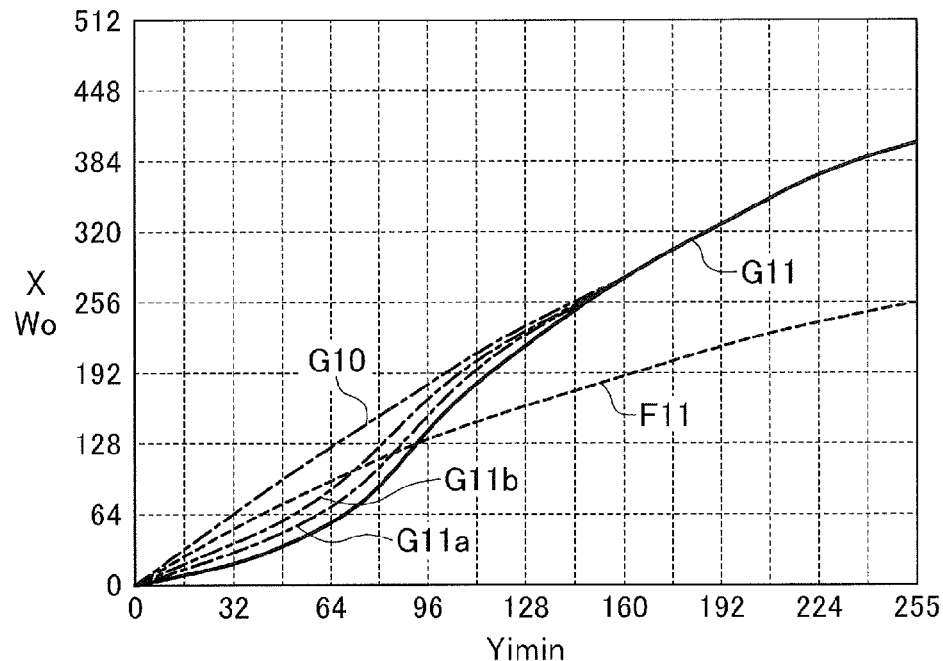
FIG. 7 is a graph showing examples of a function g(Yimax, Yimin) and a function f(Yimin) used in Embodiment 2.
Figure 8:
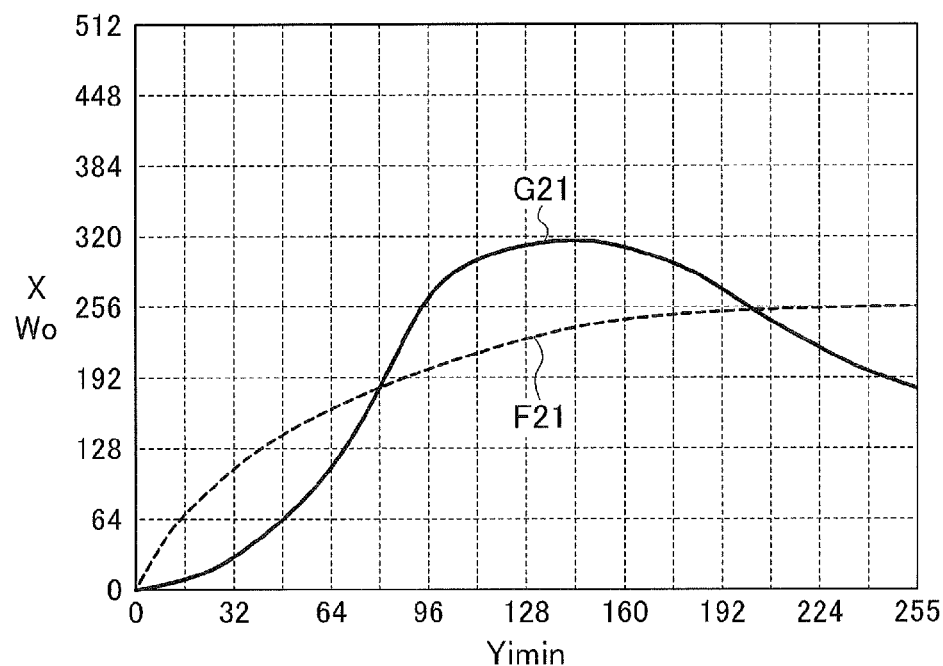
FIG. 8 is a graph showing other examples of the function g(Yimax, Yimin) and the function f(Yimin) used in Embodiment 2.
Figure 9:
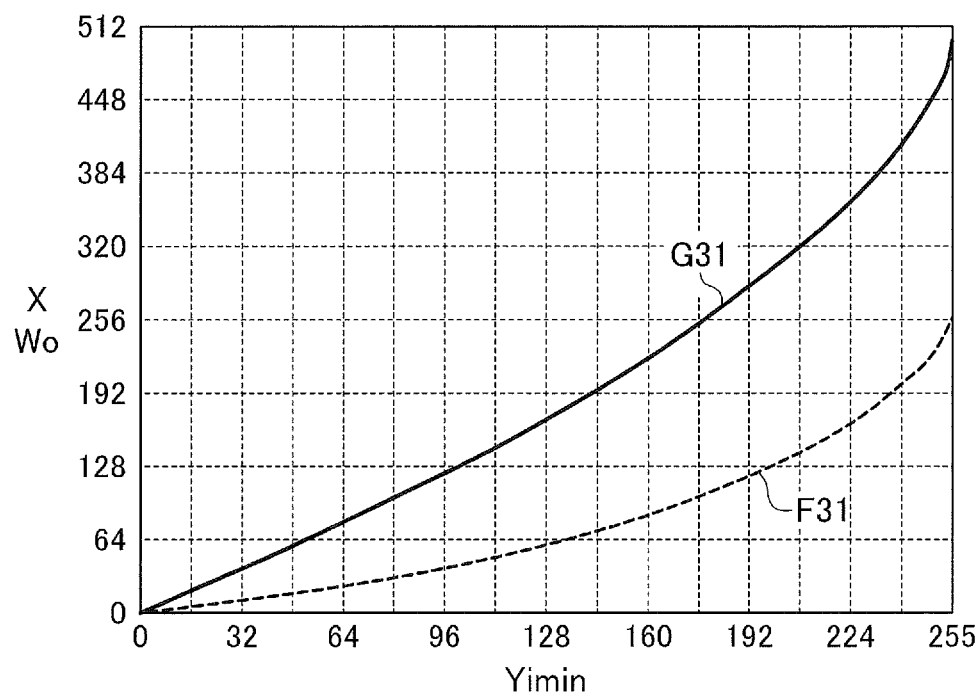
FIG. 9 is a graph showing still other examples of the function g(Yimax, Yimin) and the function f(Yimin) used in Embodiment 2.

Examples of the function g(Yimax, Yimin) and the function f(Yimin) are shown in FIG. 7, FIG. 8 and FIG. 9. In the graphs, the horizontal axis represents Yimin, and the vertical axis represents the saturation adjustment value X (solid lines G11, G21, G31), and the white pixel data Wo (broken lines F11, F21, F31) obtained by the respective functions.

In any of FIG. 7, FIG. 8 and FIG. 9, f(Yimin) represented by the broken line F11, F21, or F31 is such that f(Yimin)=0 when Yimin=0; f(Yimin)=255 (a value equal to the maximum gradation value of Yimin) when Yimin=255 (maximum gradation value); and f(Yimin) increases monotonically over the entire range as Yimin increases from 0 to 255 (maximum gradation value).

Furthermore, in FIG. 7 and FIG. 8, f(Yimin) represented by the broken lines F11, F21 are curves which are upwardly convex. In FIG. 9, f(Yimin) represented by the broken line F31 is a curve which is downwardly convex.

That is, in the example shown in FIG. 7, the function f(Yimin) is so set as to monotonically increase with increase in Yimin, along a curve F11 which is upwardly convex. The function g(Yimax, Yimin), when Yimax=255, is set to be weakly S-shaped, as shown by the solid line G11, i.e., to increase monotonically along a curve which is downwardly convex in the range where Yimin is small, and upwardly convex in the range where Yimin is large. Furthermore, it is so set that the curves showing the function g(Yimax, Yimin) in the range where Yimin is small, gradually become closer as Yimax becomes smaller, as indicated by chain lines G11a, G11b, and finally coincide with the chain line G10 when Yimax=Yimin. By such a setting, when the saturation Si of the input pixel data is high (when Yimax is relatively small) the saturation So after the signal conversion is made low; otherwise the saturation So after the signal conversion is made high.

The amount of increase in the saturation is determined by the magnitude of the saturation adjustment value X, as seen from the expression (15). By realizing the function g(Yimax, Yimin) by the use of a two-dimensional LUT 2a, as shown in FIG. 7, the amount of change in the saturation with respect to the input pixel data can be set freely.

In the example shown in FIG. 8, the function f(Yimin) is so set as to monotonically increase with increase in Yimin along a curve F21 which is upwardly convex, and the function g(Yimax, Yimin) is so set as to vary with respect to Yimin as shown by the solid line G21, without regard to Yimax, along a peak-shaped curve (increasing in the range where Yimin is small, and decreasing in the range where Yimin is large). Thus, it is also possible to set the function g(Yimax, Yimin) to be a function which depends only on Yimin, when it does not exceed the upper limit L shown in FIG. 4. In the example of FIG. 8, the saturation So after the signal conversion is smaller than the saturation Si before the signal conversion in the range where Yimin is equal to or smaller than "82" (first value) and equal to or greater than "204" (second value). The saturation after the signal conversion is larger than the saturation Si before the signal conversion in the range where Yimin is from 83 to 203.

It was shown by the expression (12) that Yomax=Yimax in the signal conversion in the present embodiment. On the other hand, the value of Yomin becomes larger, when the saturation So is decreased than if it is increased, and the luminance of the image represented by the output pixel data Ro, Go, Bo, Wo is increased.

That is, by setting the functions such that the function g(Yimax, Yimin) is smaller than the function f(Yimin) in the range where Yimin is large, as shown in FIG. 8, it is possible to increase the luminance of the part where the luminance of the input pixel data is high.

In the example shown in FIG. 9, the function g(Yimax, Yimin) and the function f(Yimin) are both set to monotonically increase with increase in Yimin along curves G31, F31 which are downwardly convex, the function g(Yimax, Yimin) is always greater than the function f(Yimin), and a value obtained by subtracting f(Yimin) from g(Yimax, Yimin), also monotonically increases with increase in Yimin. With such a setting, the saturation So after the signal conversion can always be made higher than the saturation Si before the signal conversion.

In the signal conversion in the present embodiment, the amount of increase in the saturation becomes larger as the saturation adjustment value X given by the function g(Yimax, Yimin) becomes larger if Yimax and Yimin are unchanged.

That is, by setting the saturation adjustment value X larger as the white pixel data Wo becomes larger, as shown in FIG. 9, it is possible to prevent the display color from becoming visually pale because of increase in the brightness owing to the white pixel data Wo over the entire image, and this effect can be obtained throughout the entire gradation levels, so that unnatural feelings can be avoided.

In general, adjustment of the saturation is accomplished by converting the image signals represented by red, green and blue, to luminance and color difference signals represented by Y, Cb, and Cr, and the color-difference signals Cb and Cr are multiplied by a gain. If the range −128 to 127 of the color difference signals which can be expressed by 8 bits is exceeded by the multiplication by a large gain, clipping is performed, resulting in color crush. Moreover, the luminance and color-difference signals need to be reversely converted to the image signals represented by red, green and blue, before output.

In the present embodiment, the saturation is adjusted by the magnitude relationship between the function g(Yimax, Yimin) and the function f(Yimin) in the process of conversion from the three-color data of red, green and blue, to the four-color data of red, green, blue and white.

The expression (12) shows that Yomax=Yimax is satisfied in this process. Accordingly, in the present embodiment, Yomin<Yimin when the saturation is increased by the signal conversion; while Yomin>Yimin when the saturation is decreased by the signal conversion. The value of Yomin is determined by the saturation adjustment value X, and Yomin=0 when the saturation adjustment value X is equal to the upper limit L.

In the range where the saturation adjustment value X does not exceed the upper limit L, Yomin is not affected by clipping, and can vary continuously. The continuous variation also occurs in the color having a value which is not equal to Yomax, Yomin among the three colors of red, green and blue.

For this reason, color crush is less likely to occur in the signal conversion according to the present embodiment, compared with the adjustment of the saturation by the use of the gain for the color-difference signals.

Moreover, the freedom in the saturation adjustment is greater because it is possible to determine how to vary the saturation depending on the saturation Si represented by the input pixel data. Furthermore, as the conversion to the luminance and color-difference signals is not involved, the saturation can be adjusted by use of simpler calculation formulae.

It may be so arranged that a plurality of different functions are stored in advance for the function g(Yimax, Yimin) and the function f(Yimin), and any of the stored functions may be selected and used for each of the function g(Yimax, Yimin) and the function f(Yimin).

The selection may be made depending on the usage environment of the display unit performing display based on the pixel data output from the signal conversion apparatus of the present embodiment. For instance, the usage environment may be detected, and the selection may be made automatically based on the result of the detection. Alternatively, the selection may be made based on the operation input by the user.

For instance, when it is desired to give priority to the improvement in the saturation, the function g(Yimax, Yimin) and the function f(Yimin) are so set that the saturation adjustment value X is larger than the white pixel data Wo; when it is desired to give priority to the improvement in the brightness, a function outputting a greater value is set as the function f(Yimin) for determining the white pixel data Wo.

By automatically changing the function g(Yimax, Yimin) and the function f(Yimin) depending on the usage environment, the signal conversion can be altered, and selection can be made, for instance, either to increase the brightness to improve the visibility in an extremely bright environment, such as out of doors in a daytime or to increase the saturation to enrich color expression in a usage environment such as dark indoors where it is not necessary to increase the brightness.

Figure 10:
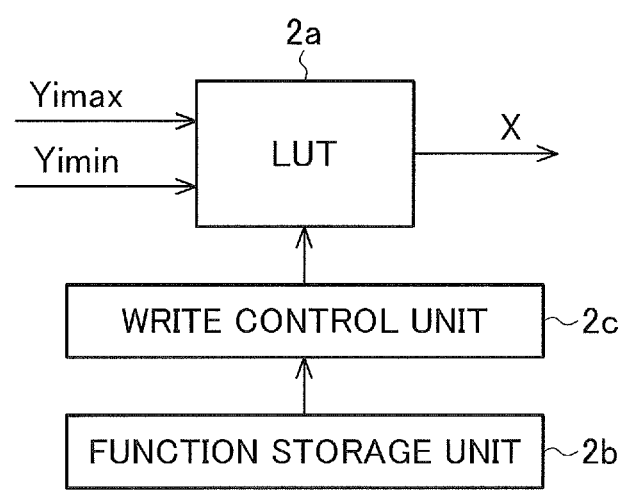
FIG. 10 is a block diagram schematically illustrating another example of configuration of the saturation adjustment value calculation unit 2 used in Embodiment 2.
Figure 11:
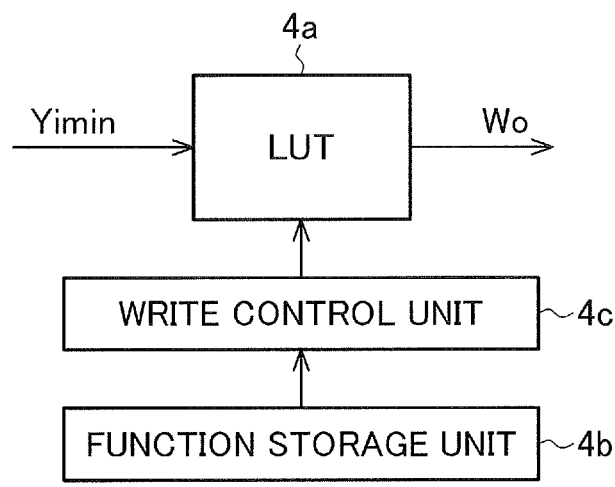
FIG. 11 is a block diagram schematically illustrating another example of configuration of the white pixel value calculation unit 4 used in Embodiment 2.

FIG. 10 and FIG. 11 illustrate examples of configurations of the saturation adjustment value calculation unit 2 and the white pixel value calculation unit 4 which enable the above-described selective use of the functions.

The saturation adjustment value calculation unit 2 shown in FIG. 10 has, in addition to a LUT 2a, similar to the one in FIG. 5, a function storage unit 2b and a write control unit 2c.

As the LUT 2a, one which is capable of being rewritten is used.

The function storage unit 2b stores a plurality of functions (candidates for the first function), for use as the first function g(Yimax, Yimin).

The write control unit 2c selects one of the plurality of candidates for the first function stored in the function storage unit 2b, and writes the selected candidate in the LUT 2a. The contents of the function of the LUT 2a are thereby rewritten. Thereafter, the rewritten function is used for the calculation of the saturation adjustment value X The white pixel value calculation unit 4 shown in FIG. 11 has, in addition to a LUT 4a similar to the one in FIG. 6, a function storage unit 4b and a write control unit 4c.

As the LUT 4a, one which is capable of being rewritten is used.

The function storage unit 4b stores a plurality of functions (candidates for the second function), for use as the second function f(Yimin).

The write control unit 4c selects one of the plurality of candidates for the second function stored in the function storage unit 4b, and writes the selected candidate in the LUT 4a. The contents of the function in the LUT 4a are thereby rewritten. Thereafter, the rewritten function is used for the calculation of the white pixel value Wo.

Embodiment 3.

Figure 12:
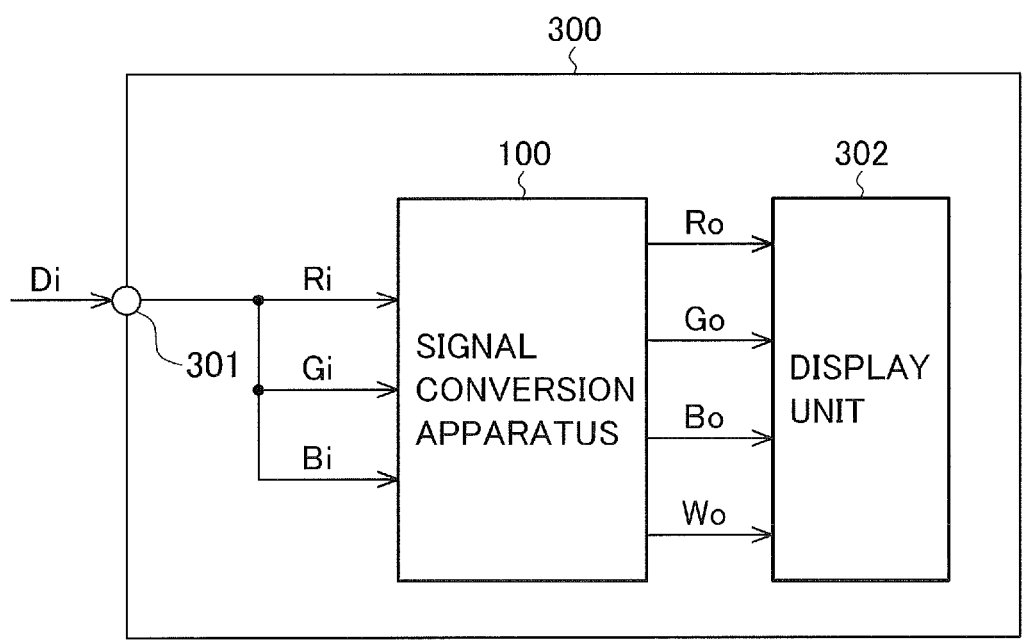
FIG. 12 is a block diagram schematically illustrating a display apparatus 300 of Embodiment 3 of the present invention.

FIG. 12 is a block diagram schematically illustrating the configuration of a display apparatus 300 of Embodiment 3. The display apparatus 300 has an input unit 301 for receiving an input image signal Di, a signal conversion apparatus 100 for receiving, as inputs, three-color pixel data Ri, Gi, Bi of red, green and blue, included in the input image signal Di, and converting them into four-color pixel data Ro, Go, Bo, Wo of red, green, blue and white, and a display unit 302 for displaying an image using four colors of red, green, blue and white on the basis of the four-color pixel data of red, green, blue and white.

Figure 13A:
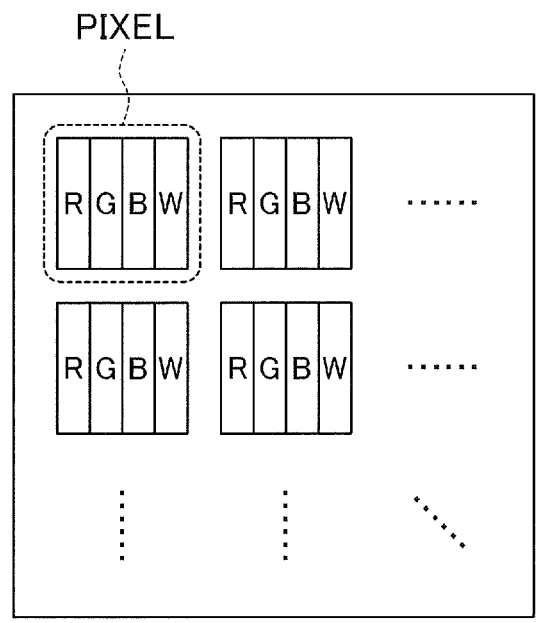
FIGS. 13(a) and 13(b) are diagrams showing examples of arrangement of sub-pixels forming pixels in a display unit.
Figure 13B:
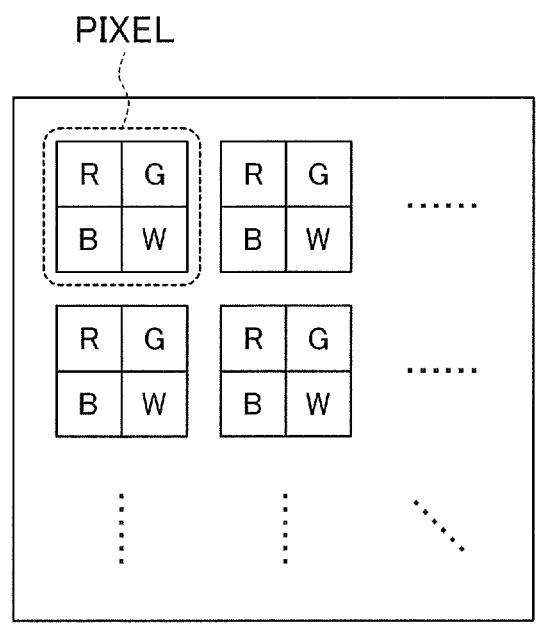

Arranged in a matrix fashion on a display panel of the display unit 302 are pixels. Each pixel is formed of sub-pixels of red (R), green (G), blue (B) and white (W) as shown in FIG. 13(a) or FIG. 13(b), and is driven by the four-color pixel data Ro, Go, Bo, Wo output from the signal conversion apparatus 100, to emit light in an amount corresponding to the gradation values of the pixel data Ro, Go, Bo, Wo.

As the signal conversion apparatus 100, the one having a configuration similar to that described in Embodiment 1 or Embodiment 2 may be used.

In Embodiment 3, the luminance of white obtained when the display unit 302 is driven by the pixel data of red, green and blue of a certain gradation value, and the luminance of white obtained when the display unit 302 is driven by the pixel data of white of the same gradation value are different.

In Embodiment 1, explanation was given on the assumption that the four-color pixel data of red, green, blue and white after the signal conversion can be replaced with the three-color data of Ro+Wo, Go+Wo, Bo+Wo, if their values are not restricted to the range which can be expressed by 8 bits. Such replacement is based on a pre-requisite that the luminance of white displayed using the pixel data of red, green and blue of a certain gradation value and the luminance displayed using the pixel data of white of the same gradation value are equal.

However, depending on the configuration of the display unit, the luminance of white displayed using the pixel data of red, green and blue of a certain gradation value and the luminance displayed using the pixel data of white of the same gradation value may be different. An example is shown in FIG. 14.

Figure 14:
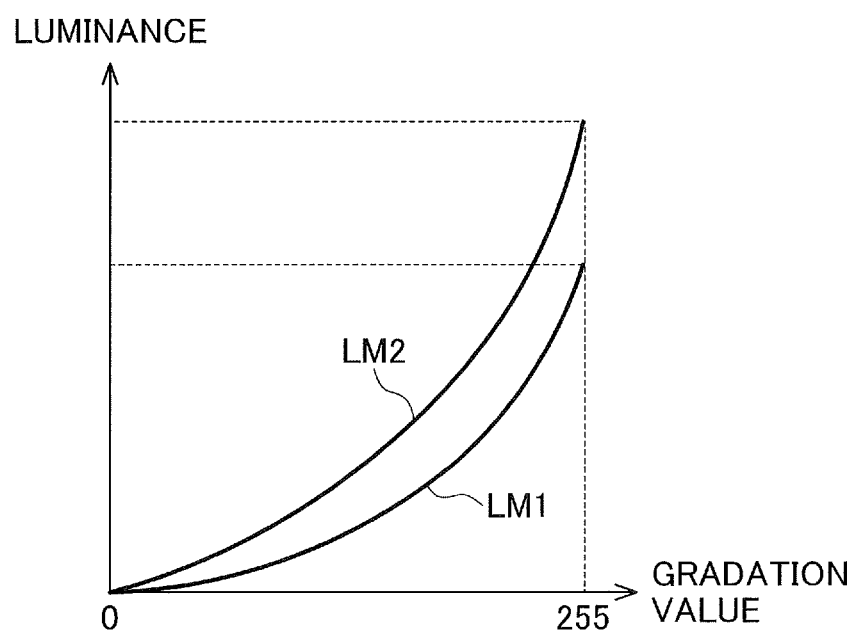
FIG. 14 is a graph showing the luminance displayed by red, green and blue and the luminance displayed by white in Embodiment 3.

FIG. 14 is a graph with a horizontal axis representing the gradation value, and a vertical axis representing the luminance, showing variations of the luminance with respect to the gradation value. The curve LM1 shows the luminance of white displayed when the three-color pixel data of red, green and blue of gradation values equal to each other are input to an RGBW-type display unit (the gradation value of the pixel data of white is kept at 0). The curve LM2 shows the luminance of white displayed when the pixel data of white is input to the same RGBW-type display unit (the gradation values of the data of red, green and blue are kept at 0). In FIG. 14, if the gradation values for red, green and blue and the gradation value for white are identical, the luminance of white displayed by the one color of white is higher than the luminance of white displayed by the three colors of red, green and blue.

To make the luminance by red, green and blue and the luminance by white to be equal, it is necessary to align the one having the higher luminance with the one having the lower luminance. It may be contemplated to limit the gradation value of white by multiplying the gradation value of white by a value less than 1 so as to achieve the alignment with the luminance of white displayed by the three colors of red, green and blue. However, this process imposes a limitation on the luminance displayable by white, and an advantage of RGBW-type display unit capable of displaying a high luminance is lost.

In the present embodiment, the gradation value of white is not restricted, but the saturation adjustment value X is adjusted depending on the difference in the luminance between RGB (red, green and blue), and W (white), in the RGBW-type display unit, enabling an appropriate signal conversion to red, green, blue and white.

The signal conversion made by the present embodiment when there is a luminance difference between RGB (red, green and blue), and W (white) will be described below. For instance, when the luminance displayed by white (the luminance displayed by the display unit when the pixel data of white having a certain gradation value is supplied) is 1.2 times the luminance displayed by red, green and blue (luminance displayed by the display unit when the pixel data of red, green and blue having the same gradation value are supplied), then the four-color pixel data of Ro, Go, Bo, Wo of red, green, blue and white after the signal conversion can be replaced with three-color data Ro', Go', Bo' having the gradation values given by:

$$Ro' = Ro + 1.2 \times Wo$$

$$Go' = Go + 1.2 \times Wo$$

$$Bo' = Bo + 1.2 \times Wo$$

(In this case, it is assumed that the gradation values of the data which the display unit can handle are not restricted to the range which can be expressed by 8 bits, and, the sub-pixels of red, green and blue of the display unit can emit light in an amount corresponding to the data Ro', Go', Bo'.)

The hue H, the saturation S, and the brightness V in the HSV color space before and after the signal conversion of the present embodiment, involving the above-described replacement can be determined as follows:

According to the expression (11), the hue H is not altered by the signal conversion, without regard to the magnitude of Wo.

For the saturation S, the following relational expression is derived from the expression (15).

[Mathematical Expression 23]

$$So = Si \times \frac{Y i \max + X}{Y i \max + 1.2 \times Wo} \quad (23)$$

For the brightness V, the following relational expression is derived from the expression (22).

[Mathematical Expression 24]

$$Vo = Vi + \frac{1.2 \times Wo}{255} \quad (24)$$

The expression (23) indicates that, when the saturation adjustment value X and the white pixel data Wo multiplied by 1.2 are equal, the saturation before the signal conversion and the saturation after the signal conversion are equal (So=Si). When the saturation adjustment value X is larger than the white pixel data Wo multiplied by 1.2, the saturation is increased by the signal conversion. When the saturation adjustment value X is smaller than the white pixel data Wo multiplied by 1.2, the saturation is decreased by the signal conversion.

That is, if the function g(Yimax, Yimin) which determines the saturation adjustment value X is set with reference to 1.2 times the function f(Yimin) which determines the white pixel data Wo, then it is possible to adopt the same treatment as in the case where there is no difference in the luminance between the white displayed by red, green and blue, and the white displayed by white in an RGBW-type display unit.

Setting the function g(Yimax, Yimin) which determines the saturation adjustment value X with reference to 1.2 times the function f(Yimin) which determines the white pixel data Wo can be realized by using g'(Yimax, Yimin) having a value 1.2 times the function g(Yimax, Yimin).

To generalize, it can be said as follows: It is assumed to be desirable to use the saturation adjustment value X and the white pixel data Wo which are respectively given by certain functions g(Yimax, Yimin) and f(Yimin) when driving a display unit of which the display luminance produced when the RGB output pixel data Ro, Go, Bo are all of a certain value (first value) Ta, e.g., a gradation maximum value, and the display luminance produced when the white pixel data Wo is of the same value Ta are identical. Based on such an assumption, when driving a display unit of which the display luminance produced when the output pixel data Ro, Go, Bo of red, green and blue are all of a certain value Ta, and the display luminance produced when the white pixel data Wo is of the same value Ta are different, and the value of the white pixel data Wo of white which produces the display luminance identical to the display luminance obtained when the output pixel data Ro, Go, Bo of red, green and blue are all of the certain value Ta is Wa, then, a desirable result is obtained if the saturation adjustment value X given by:

$$g'(Yimax, Yimin) = (Wa/Ta) \times g(Yimax, Yimin),$$

instead of the above function g(Yimax, Yimin) is used, while the white pixel data Wo given by the function f(Yimin) is used.

In this case, the decision unit 23 in the saturation adjustment value calculation unit 2 shown in FIG. 2 outputs a value Wa/Ta times the functioni g(Yimax, Yimin) which is obtained as the smaller one of the upper limit L calculated by the upper limit calculation unit 21 and the provisional value gt(Yimin) calculated by the provisional value calculation unit 22, as the saturation adjustment value X.

In this way, even when there is a luminance difference between the white displayed by red, green and blue and the white displayed by white in an RGBW-type display unit, the luminance difference in the displayed white can be eliminated, by varying the saturation adjustment value X based on the luminance difference, without multiplying the white pixel data Wo by a value less than 1. It is therefore possible to increase the brightness while controlling the saturation, without lowering the luminance of white.

The functions of the signal conversion apparatus in Embodiments 1 to 3 having been described above can be realized by hardware circuits, in one aspect of the invention. They may be realized by cooperation between hardware resources and software. Specifically, the functions of the signal conversion apparatus may be realized by having a computer execute an image processing program. More specifically, the functions of the signal conversion apparatus may be implemented by having a main storage unit read the image processing program recorded in a recording medium such as a ROM, and having a central processing unit execute the image processing program. The image processing program may be provided by being recorded in a computer-readable recording medium such as an optical disc, or by being supplied via a communication network, such as an internet.

Accordingly, a signal conversion method implemented by using the signal conversion apparatus also forms part of the present invention, and a program for having a computer execute the functions of the signal conversion apparatus, or the processes of the respective steps of the signal conversion method, and a computer-readable recording medium storing the program also form part of the present invention.

REFERENCE CHARACTERS

1: pixel value comparison unit; 2: saturation adjustment value calculation unit; 2a: LUT; 3: three-color pixel value calculation unit; 4: white pixel value calculation unit; 4a: LUT; 21: upper limit calculation unit; 22: provisional value calculation unit; 23: decision unit; 100: signal conversion apparatus; 300: display apparatus; 301: input unit; 302: display unit.

What is claimed is:

1. A signal conversion apparatus comprising:
a processor; and
a memory coupled to the processor, the memory storing a program which, when executed, causes the processor to perform a process including,
determining a maximum value Yimax and a minimum value Yimin of input pixel data Ri, Gi, Bi of red, green and blue for each of a plurality of pixels;
determining a saturation adjustment value X by using a first function g(Yimax, Yimin) which does not exceed an upper limit L which is given from the maximum value Yimax, and the minimum value Yimin, by:

$$L = \frac{Yimax \times Yimin}{Yimax - Yimin}$$

determining output pixel data Ro, Go, Bo, by using the input pixel data Ri, Gi, Bi, the maximum value Yimax, and the saturation adjustment value X, by:

$$Ro = Ri \times \frac{(X + Yimax)}{Yimax} - X$$

$$Go = Gi \times \frac{(X + Yimax)}{Yimax} - X$$

$$Bo = Bi \times \frac{(X + Yimax)}{Yimax} - X$$

and
determining white pixel data Wo from the minimum value Yimin by using a second function f(Yimin);
wherein
when the saturation adjustment value X is larger than the white pixel data Wo, the saturation represented by the output pixel data Ro, Go, Bo and the white pixel data Wo is made higher than the saturation represented by the input pixel data Ri, Gi, Bi, and
when the saturation adjustment value X is smaller than the white pixel data Wo, the saturation represented by the output pixel data Ro, Go, Bo and the white pixel data Wo is made lower than the saturation represented by the input pixel data Ri, Gi, Bi.

2. The signal conversion apparatus as set forth in claim 1, wherein the saturation adjustment value is determined by:
determining the upper limit L from the maximum value Yimax and the minimum value Yimin;
determining a provisional value of the first function from the minimum value Yimin, by a third function gt(Yimin); and
determining a smaller one of the upper limit L and the provisional value gt(Yimin) as the first function g(Yimax, Yimin).

3. The signal conversion apparatus as set forth in claim 1, the program including a LUT for receiving, as inputs, the maximum value Yimax and the minimum value Yimin, and outputting the saturation adjustment value X.

4. The signal conversion apparatus as set forth in claim 1, wherein
the second function f(Yimin) is a function which monotonically increases with respect to the minimum value Yimin, and
when the minimum value Yimin is zero, the second function f(Yimin) is also zero.

5. The signal conversion apparatus as set forth in claim 1, wherein
the first function g(Yimax, Yimin) and the second function f(Yimin) are changeable.

6. An image display apparatus comprising:
the signal conversion apparatus as set forth in claim 1, and
a display for displaying an image using the pixel data of four colors of red, green, blue and white.

7. The image display apparatus as set forth in claim 6, wherein
the display has a difference between the luminance of white displayed by the pixel data of red, green and blue of a certain gradation value, and the luminance of white displayed by the pixel data of white of the same gradation value, and
when the white pixel data Wo producing a display luminance which is identical to the display luminance obtained when the output pixel data Ro, Go, Bo of red, green and blue are all of a certain first gradation value Ta, is of a second gradation value Wa, the saturation adjustment value X is set with reference to a value obtained by multiplying the second function f(Yimin) by a ratio Wa/Ta of the second gradation value to the first gradation value.

8. A signal conversion method comprising:
executing, by a processor, a program to perform a process including,
determining a maximum value Yimax and a minimum value Yimin of input pixel data Ri, Gi, Bi of red, green and blue for each of a plurality of pixels to be displayed by a display apparatus;
determining a saturation adjustment value X by using a first function g(Yimax, Yimin) which does not exceed an upper limit L which is given from the maximum value Yimax, and the minimum value Yimin, by:

$$L = \frac{Yimax \times Yimin}{Yimax - Yimin}$$

determining output pixel data Ro, Go, Bo, by using the input pixel data Ri, Gi, Bi, the maximum value Yimax, and the saturation adjustment value X, by:

$$Ro = Ri \times \frac{(X + Yimax)}{Yimax} - X \qquad \text{[Mathematical Expression 28]}$$
$$Go = Gi \times \frac{(X + Yimax)}{Yimax} - X$$
$$Bo = Bi \times \frac{(X + Yimax)}{Yimax} - X$$

and
determining white pixel data Wo from the minimum value Yimin by using a second function f(Yimin);
wherein
when the saturation adjustment value X is larger than the white pixel data Wo, the saturation represented by the output pixel data Ro, Go, Bo and the white pixel data Wo is made higher than the saturation represented by the input pixel data Ri, Gi, Bi, and
when the saturation adjustment value X is smaller than the white pixel data Wo, the saturation represented by the output pixel data Ro, Go, Bo and the white pixel data Wo is made lower than the saturation represented by the input pixel data Ri, Gi, Bi.

9. A non-transitory computer-readable recording medium storing a program which, when executed by a computer, causes the computer to execute a process comprising:
determining a maximum value Yimax and a minimum value Yimin of input pixel data Ri, Gi, Bi of red, green and blue for each of a plurality of pixels to be displayed by a display apparatus;
determining a saturation adjustment value X by using a first function g(Yimax, Yimin) which does not exceed an upper limit L which is given from the maximum value Yimax, and the minimum value Yimin, by:

$$L = \frac{Yimax \times Yimin}{Yimax - Yimin}$$

determining output pixel data Ro, Go, Bo, by using the input pixel data Ri, Gi, Bi, the maximum value Yimax, and the saturation adjustment value X, by:

$$Ro = Ri \times \frac{(X + Yimax)}{Yimax} - X$$
$$Go = Gi \times \frac{(X + Yimax)}{Yimax} - X$$
$$Bo = Bi \times \frac{(X + Yimax)}{Yimax} - X$$

and
determining white pixel data Wo from the minimum value Yimin by using a second function f(Yimin);
wherein
when the saturation adjustment value X is larger than the white pixel data Wo, the saturation represented by the output pixel data Ro, Go, Bo and the white pixel data Wo is made higher than the saturation represented by the input pixel data Ri, Gi, Bi, and
when the saturation adjustment value X is smaller than the white pixel data Wo, the saturation represented by the output pixel data Ro, Go, Bo and the white pixel data Wo is made lower than the saturation represented by the input pixel data Ri, Gi, Bi.

* * * * *